US012798366B2

(12) United States Patent
Wagner et al.

(10) Patent No.: US 12,798,366 B2
(45) Date of Patent: Nov. 17, 2026

(54) TRANSMISSION, TRANSAXLE WITH A TRANSMISSION AND POWERTRAIN FOR A VEHICLE

(71) Applicant: BRP-ROTAX GMBH & CO. KG, Gunskirchen (AT)

(72) Inventors: Robert Wagner, Steinhaus bei Wels (AT); Thomas Gaertner, Gunskirchen (AT); Martin Schallauer, Gunskirchen (AT); Paul Allmann, Linz (AT); Thomas Gadermayr, Taiskirchen (AT); Felix-Emanuel Benea, Seewalchen am Attersee (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 19/171,560

(22) Filed: Apr. 7, 2025

(65) Prior Publication Data

US 2025/0313083 A1 Oct. 9, 2025

Related U.S. Application Data

(60) Provisional application No. 63/575,995, filed on Apr. 8, 2024.

(51) Int. Cl.
*B60K 17/08* (2006.01)
*B60K 17/16* (2006.01)
(Continued)

(52) U.S. Cl.
CPC ............ *B60K 17/08* (2013.01); *B60K 17/165* (2013.01); *B60K 17/22* (2013.01); *F16H 57/021* (2013.01);
(Continued)

(58) Field of Classification Search
CPC ...... B60K 17/08; B60K 17/165; B60K 17/22; F16H 57/021; F16H 57/032;
(Continued)

(56) References Cited

U.S. PATENT DOCUMENTS 6,896,087 B2 * 5/2005 Korenjak ................ F02B 61/02 180/230
9,027,430 B2 * 5/2015 Mitsubori ............... F16H 61/26 74/473.36
(Continued)

OTHER PUBLICATIONS

"Shaft." Merriam-Webster.com Dictionary, Merriam-Webster, https://www.merriam-webster.com/dictionary/shaft. Accessed Mar. 2, 2026. (Year: 2026).*

*Primary Examiner* — Jason D Shanske
*Assistant Examiner* — Matthew James O'Neill
(74) *Attorney, Agent, or Firm* — BCF LLP

(57) ABSTRACT

A powertrain for a vehicle includes an engine, a continuously variable transmission (CVT) operatively connected to the engine, a transmission operatively connected to the CVT, and a driving shaft operatively connected to the transmission. The driving shaft is positioned laterally between the engine and the CVT, and vertically higher than a lowest point of the engine. Additionally, a powertrain for a vehicle includes an engine having engine housing, a CVT having a CVT housing having first and second housing portions, the first housing portion being disposed between the engine housing and the second housing portion, a transmission having a transmission housing, and a driving shaft. The first housing portion is connected to the engine and transmission housing, the first housing portion has a supporting portion supporting the driving shaft, and a mounting bracket for mounting the powertrain to the vehicle. A transmission is also disclosed.

11 Claims, 9 Drawing Sheets

(51) Int. Cl.

| | |
|---|---|
| ***B60K 17/22*** | (2006.01) |
| ***F16H 57/021*** | (2012.01) |
| ***F16H 57/032*** | (2012.01) |
| ***F16H 57/035*** | (2012.01) |
| ***F16H 63/04*** | (2006.01) |
| ***F16H 63/32*** | (2006.01) |
| *F16H 57/02* | (2012.01) |

(52) U.S. Cl.
CPC ......... *F16H 57/032* (2013.01); *F16H 57/035* (2013.01); *F16H 63/04* (2013.01); *F16H 63/32* (2013.01); *F16H 2057/0203* (2013.01); *F16H 2057/02052* (2013.01)

(58) Field of Classification Search
CPC ........ F16H 57/035; F16H 63/04; F16H 63/32; F16H 2057/0203; F16H 2057/02052
See application file for complete search history.

(56) References Cited

U.S. PATENT DOCUMENTS

| | | | | |
|---|---|---|---|---|
| 10,160,453 | B1 * | 12/2018 | Brandstaetter ...... | B60W 10/107 |
| 11,046,176 | B2 | 6/2021 | Danielson et al. | |
| 11,313,463 | B2 | 4/2022 | Kindl | |
| 2005/0103558 | A1 * | 5/2005 | Davis ..................... | B60K 17/08 180/383 |
| 2018/0180163 | A1 * | 6/2018 | Schleif ................ | F16H 57/0415 |
| 2020/0248804 | A1 * | 8/2020 | Kindl .................. | F16H 63/3433 |
| 2021/0213822 | A1 | 7/2021 | Ripley et al. | |
| 2022/0349458 | A1 * | 11/2022 | Foxhall ................. | F16H 57/033 |
| 2024/0003412 | A1 * | 1/2024 | Lampron ............. | B60K 17/165 |

* cited by examiner

TRANSMISSION, TRANSAXLE WITH A TRANSMISSION AND POWERTRAIN FOR A VEHICLE

CROSS-REFERENCE TO RELATED APPLICATION

The present application claims priority to U.S. Provisional Patent Application No. 63/575,995, filed Apr. 8, 2024 entitled "Transmission, Transaxle With a Transmission And Powertrain for a Vehicle", which is incorporated by reference herein in its entirety.

TECHNICAL FIELD

The present technology relates to vehicle transmissions, vehicle transaxles and vehicle powertrains.

BACKGROUND

Powertrains for vehicles can include engines, variable transmissions, sub-transmissions (also referred to as simply transmissions), and driving shafts for driving ground-engaging members such as wheels or track systems.

These powertrains significantly impact various vehicle parameters in a variety of ways. For example, a configuration of these powertrains, such as an arrangement of components thereof, can limit how low a center of mass of their respective vehicle can be.

Additionally, conventional powertrains can have numerous different components, which can complicate assembly, and can increase manufacturing costs.

Therefore, there is a desire for a transmission and a powertrain without at least some of the inconveniences described above.

SUMMARY

According to one aspect of the present technology, there is provided a powertrain for a vehicle. The powertrain includes an engine, a continuously variable transmission (CVT), a transmission and a driving shaft. The CVT is operatively connected to the engine, the transmission operatively connected to the CVT, and the driving shaft is operatively connected to the transmission. The driving shaft is positioned laterally between the engine and the CVT, and vertically higher than a lowest point of the engine.

In some embodiments, the engine has an oil pan. The oil pan defines the lowest point of the engine.

In some embodiments, the driving shaft is positioned vertically higher than a lowest point of the CVT.

In some embodiments, the CVT has a CVT housing supporting the driving shaft.

In some embodiments, the driving shaft defines a longitudinal axis, the engine has an engine housing, and the transmission has a transmission housing. The engine housing is disposed, with respect to the longitudinal axis, at least partially longitudinally forward from the transmission housing. The driving shaft extends from the transmission housing, with respect to the longitudinal axis, longitudinally forward from the engine housing.

According to another aspect of the present technology, there is provided a powertrain for a vehicle. The powertrain includes an engine, a CVT operatively connected to the engine, a transmission operatively connected to the CVT, and a driving shaft operatively connected to the transmission. The engine has an engine housing, the CVT has a CVT housing having a first housing portion and a second housing portion connected to the first housing portion, and the transmission has a transmission housing. The first housing portion is disposed between the engine housing and the second housing portion. The first housing portion is connected to the engine housing and to the transmission housing. The first housing portion has a supporting portion supporting the driving shaft. The first housing portion has a mounting bracket for mounting the powertrain to the vehicle.

In some embodiments, the first housing portion is made of a metal.

In some embodiments, the metal is an aluminum alloy.

In some embodiments, the first housing portion is a unitary component.

In some embodiments, the supporting portion is disposed vertically higher than the mounting bracket.

In some embodiments, the supporting portion extends laterally from the first housing portion toward the engine.

In some embodiments, the mounting bracket is at least partially laterally aligned with the supporting portion.

According to another aspect of the present technology, there is provided a transmission including a first shaft, a second shaft, a shift drum and a shift assembly. The first shaft is configured to operatively connect to an engine. The second shaft is configured to operatively connect to at least one driving shaft. The shift drum is for selectively controlling torque transfer between the first shaft and the second shaft. The shift drum is rotatable about a shift drum axis, and is positioned vertically lower than the first shaft. The shift assembly includes a shift shaft and a shift member. The shift shaft defines a shift shaft axis extending generally parallel to the shift drum axis, the shift shaft being positioned vertically lower than the first shaft. The shift member is connected to the shift shaft, and is operatively connected to the shift drum for selectively rotating the shift drum about the shift drum axis.

In some embodiments, the transmission further includes a third shaft operatively connected to the shift drum, to the first shaft and to the second shaft.

In some embodiments, the shift shaft is positioned vertically lower than the third shaft.

In some embodiments, the transmission further includes a fork rod and a shift fork. The fork rod defines a fork rod axis extending generally parallel to the shift drum axis. The shift fork is slidably connected to the fork rod, and is operatively connected to the shift drum. A highest point of the shift member is vertically lower than a highest point of the shift fork.

In some embodiments, the shift shaft is positioned vertically higher than the shift drum.

According to another aspect of the present technology, there is provided a transaxle including the transmission according to the above aspect or according to the above aspect and one or more of the above embodiments, a differential operatively connected to the transmission, and the at least one driving shaft operatively connected to the differential.

In some embodiments, the differential defines a differential axis, and the shift shaft is positioned vertically higher than the differential axis.

According to another aspect of the present technology, there is provided a transmission according to the above aspect or according to the above aspect and one or more of the above embodiments, the engine, the CVT operatively connected to the engine, and the at least one driving shaft.

The transmission is operatively connected to the CVT, and the at least one driving shaft is operatively connected to the transmission.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

The term "generally" used in the context of a given orientation, refers to the given orientation as well as orientations offset by two or three degrees from the given orientation.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not necessarily drawn to scale.

DETAILED DESCRIPTION

The present technology is described with reference to its use in an off-road side-by-side vehicle. It is contemplated that the present technology could be implemented in different vehicles, including, but not limited to, all-terrain vehicles (ATVs), automobiles, other off-road vehicles, snowmobiles, and karts.

Figure 1:
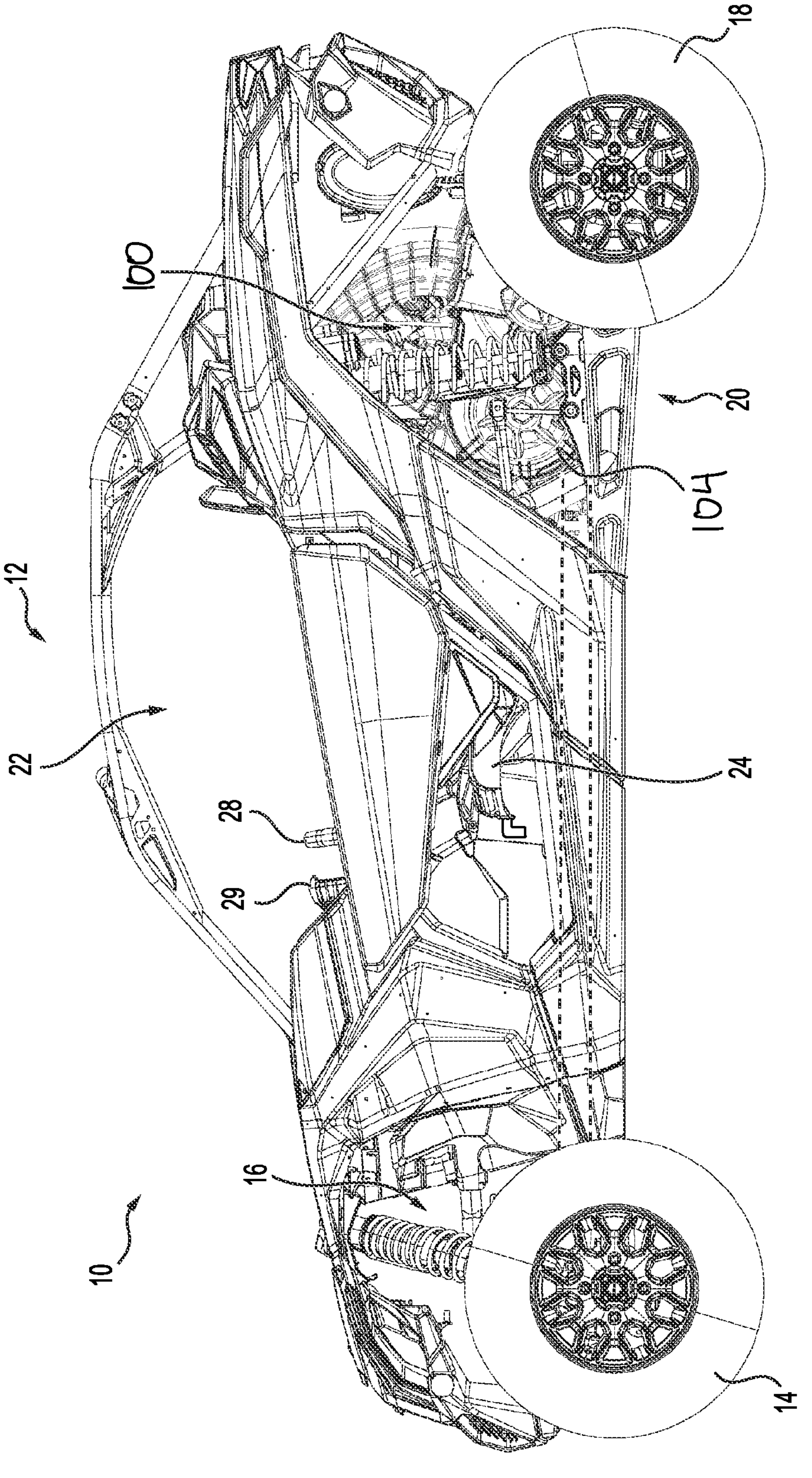
FIG. 1 is a left side elevation view of a vehicle.

The general features of a side-by-side vehicle 10 will be described with respect to FIG. 1 as one non-limiting application of the present technology.

The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. A roll cage 106 defines a top side of the cockpit area 22. In the present embodiment, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10.

A steering wheel 28 is disposed in front of the driver seat 24. The steering wheel 28 is used to turn the front wheels 14 to steer the vehicle 10. Various displays and gauges 29 are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

Figure 2:
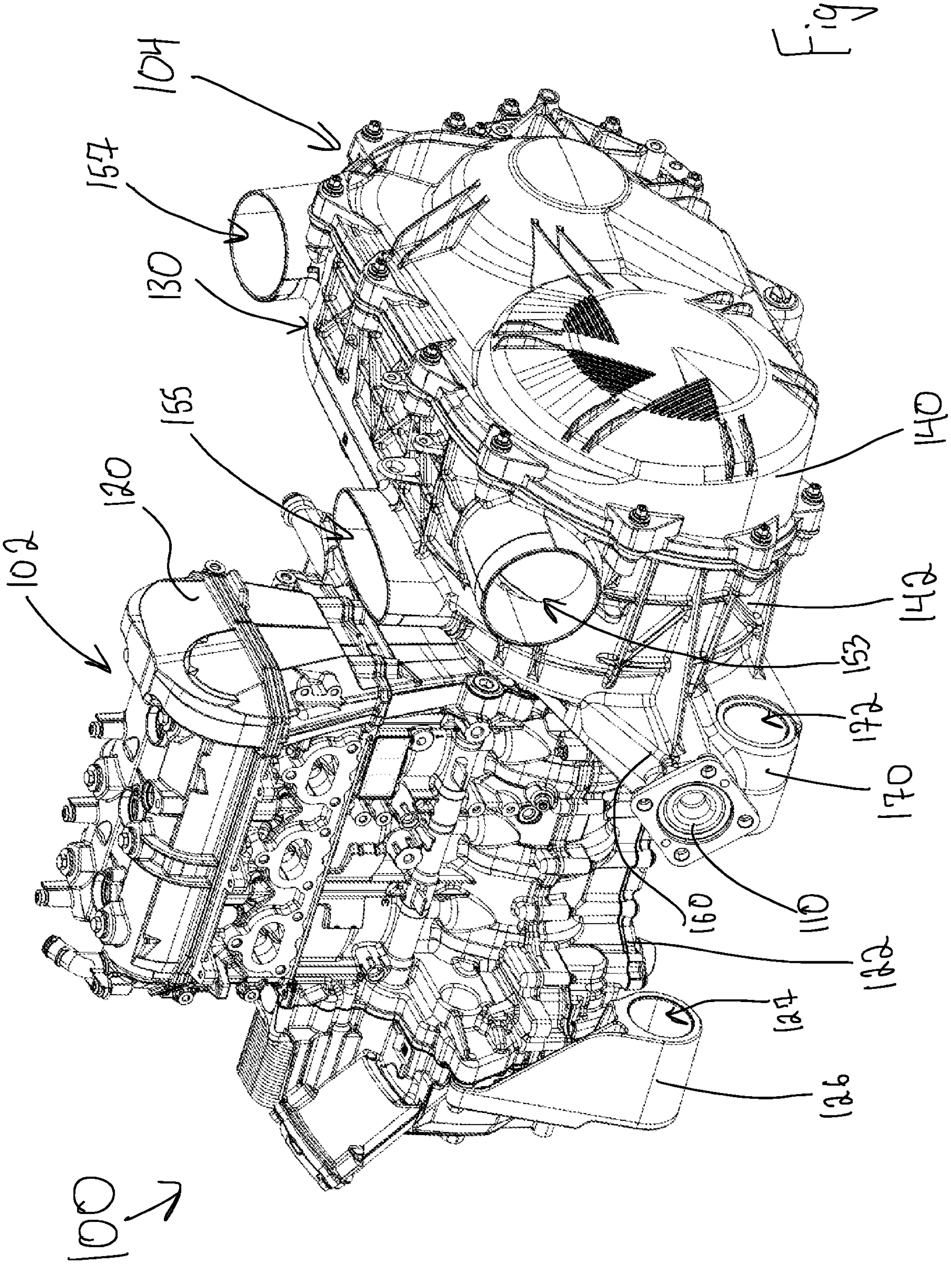
FIG. 2 is a top, front, left side perspective view of a powertrain of the vehicle of FIG. 1, the powertrain including an engine, a continuously variable transmission (CVT), a transaxle and a driving shaft.
Figure 3:
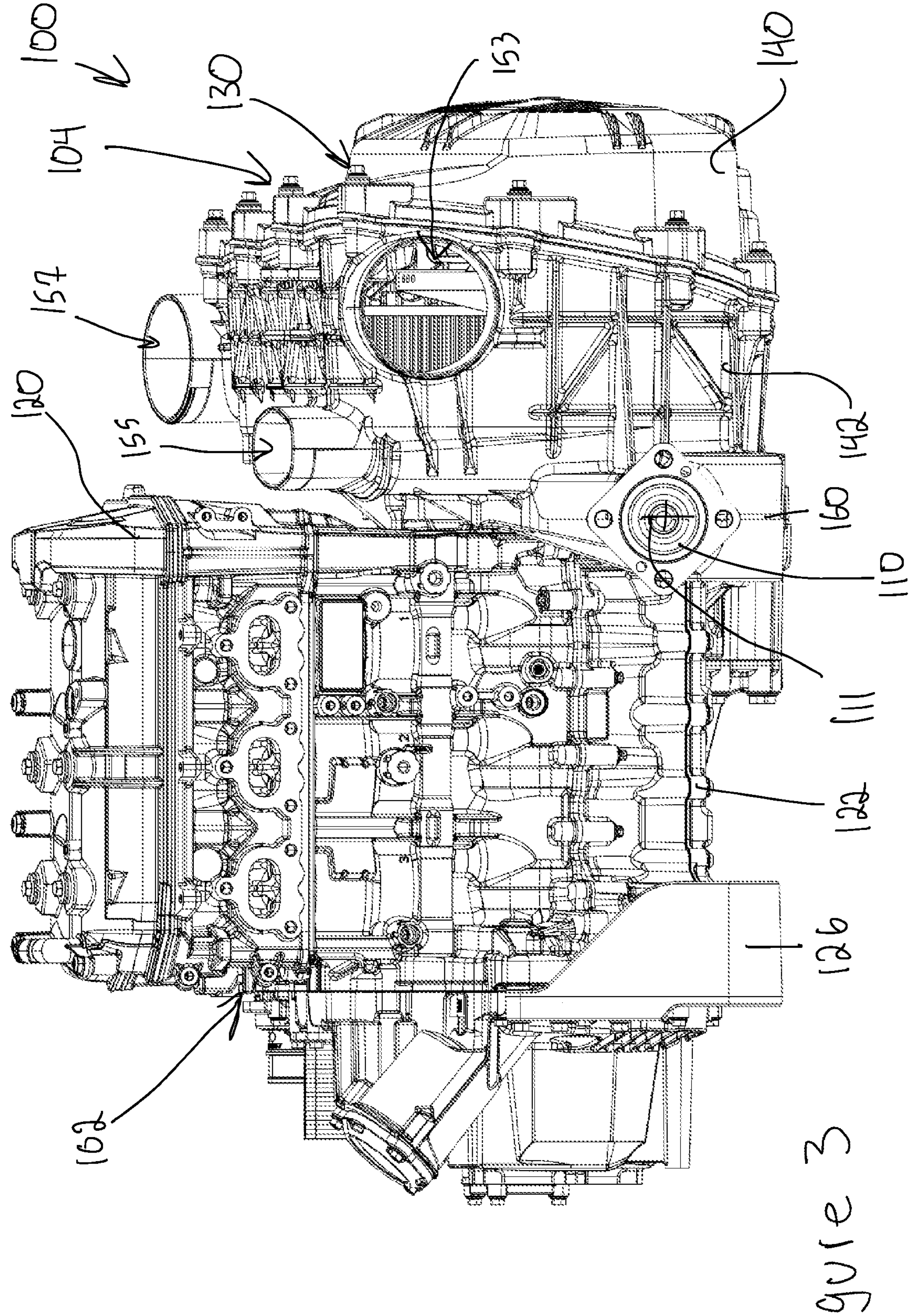
FIG. 3 is a front elevation view of the powertrain of FIG. 2.
Figure 4:
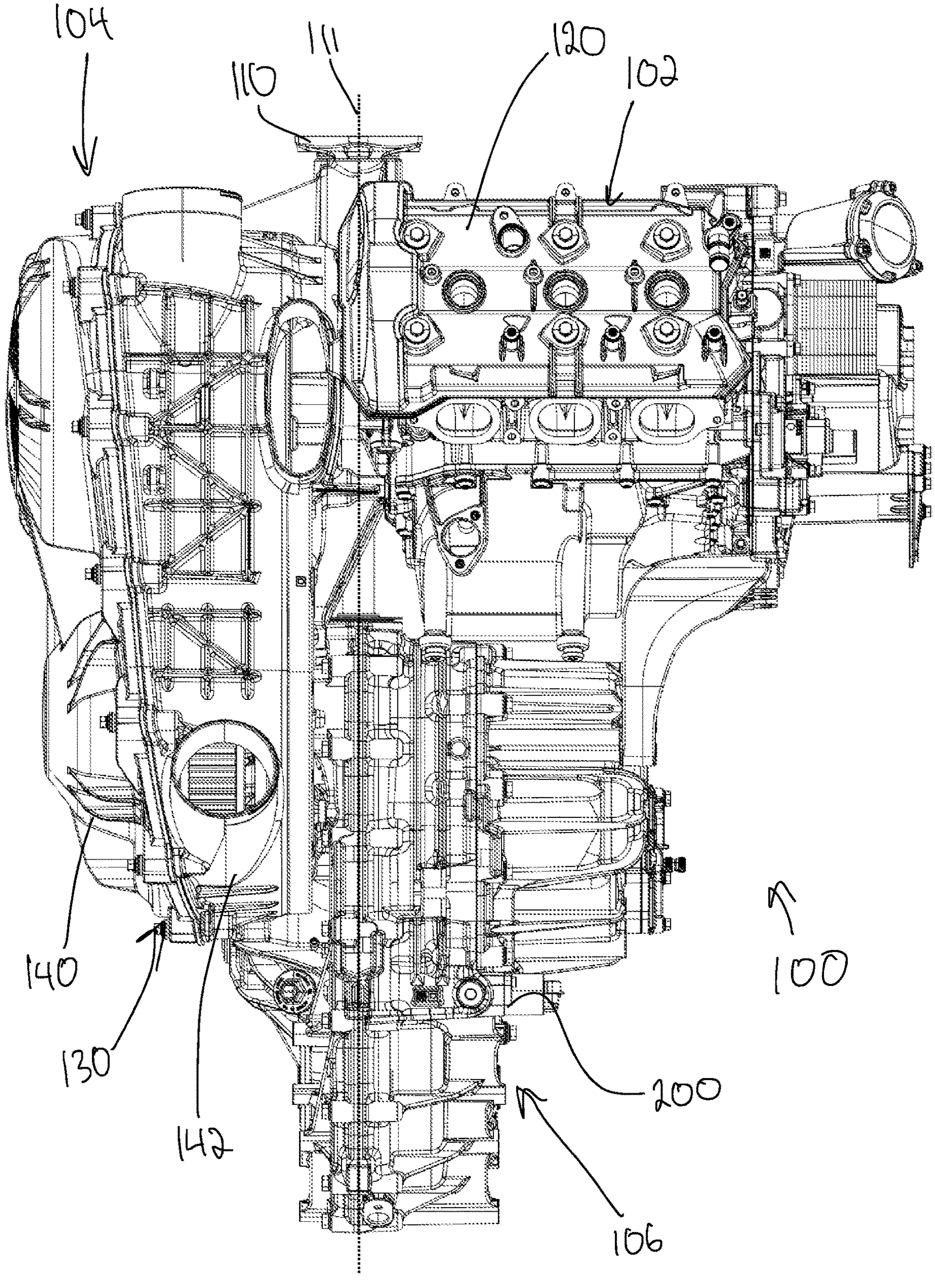
FIG. 4 is a top plan view of the powertrain of FIG. 2.

With additional reference to FIGS. 2 to 4, the vehicle 10 further includes a powertrain 100 that is connected to the frame 12 in a rear portion of the vehicle 10 via mounting brackets 126, 170, which will be described in greater detail below. The powertrain 100 includes an engine 102, a continuously variable transmission (CVT) 104, a transaxle 106, and a driving shaft 110. The transaxle 106 includes a transmission 108 and a differential 109. In some embodiments, the differential 109 could be separate from the transmission 108, such that the powertrain 100 could include the engine 102, the CVT 104, the transmission 108 and the separated differential 109.

The engine 102 is operatively connected to and drives the CVT 104. The CVT 104 is operatively connected to and drives the transaxle 106. The transaxle 106 is operatively connected to and drives rear wheels 18. The transaxle 106 is also connected to and drives the driving shaft 110.

The driving shaft 110 is in turn operatively connected to and drives the front wheels 14 via a front differential (not shown). In some embodiments, the driving shaft 110 may be operatively connected to the rear wheels 16. Thus, the engine 102 is configured to drive the front wheels 14 by way of the CVT 104, the transaxle 106 and the driving shaft 110.

The engine 102 is disposed, at least partially, longitudinally forward from the transaxle 106. The CVT 104 is laterally spaced from the engine 102. More specifically, the CVT 104 is disposed on a left side of the engine 102, with part of the CVT 104 being longitudinally aligned with the engine 102, and part of the CVT 104 being longitudinally aligned with the transaxle 106. The driving shaft 110 is disposed laterally between the engine 102 and the CVT 104, which enables the driving shaft 110 to be positioned vertically higher than lowest points of the engine 102 and the CVT 104. This is in part also enabled by the configuration of the transmission 108, which will be described in greater detail below.

In the present embodiment, the engine 102 is a three-cylinder, four-stroke internal combustion engine 102. It is contemplated that other types of internal combustion engines could be used, such as a V-twin or a two-stroke internal combustion engine for example. It is also contemplated that in some embodiments, the engine 102 could be replaced by another type of motor such as a diesel engine or an electric motor for example.

The engine 102 has an engine housing 120. The engine housing 120 includes an oil pan 122. The oil pan 122 defines the lowest point of the engine 102, and thus, a lowest point of the engine housing 120. At a front, lower end of the engine 102, a mounting bracket 126 is connected to the engine housing 120. The mounting bracket 126 defines an aperture 127 that is oriented such that its radial center axis extends generally laterally. The aperture 127 receives part of the frame 12 of the vehicle 10 therethrough. The orientation and/or shape of the aperture 127 may differ from one embodiment to another. The engine 102 also includes a crankshaft 124 (FIG. 6) which is partially disposed in the engine housing 120. The crankshaft 124 is operatively connected to pistons (not shown) via rods (not shown). The crankshaft 124 extends out of the engine housing 120, and enters a CVT housing 130 to operatively connect to a drive pulley 132 of the CVT 104, which will now be described.

The CVT 104 includes the CVT housing 130, the drive pulley 132, a driven pulley 134 and a belt 136. The drive pulley 132, the driven pulley 134 and the belt 136 are received in the CVT housing 130. The belt 136 drivingly connects the drive and driven pulleys 132, 134 to one another, such that in response to the drive pulley 132 rotating (by to the crankshaft 124), the belt 136 causes the driven pulley 134 to rotate.

Figure 5:
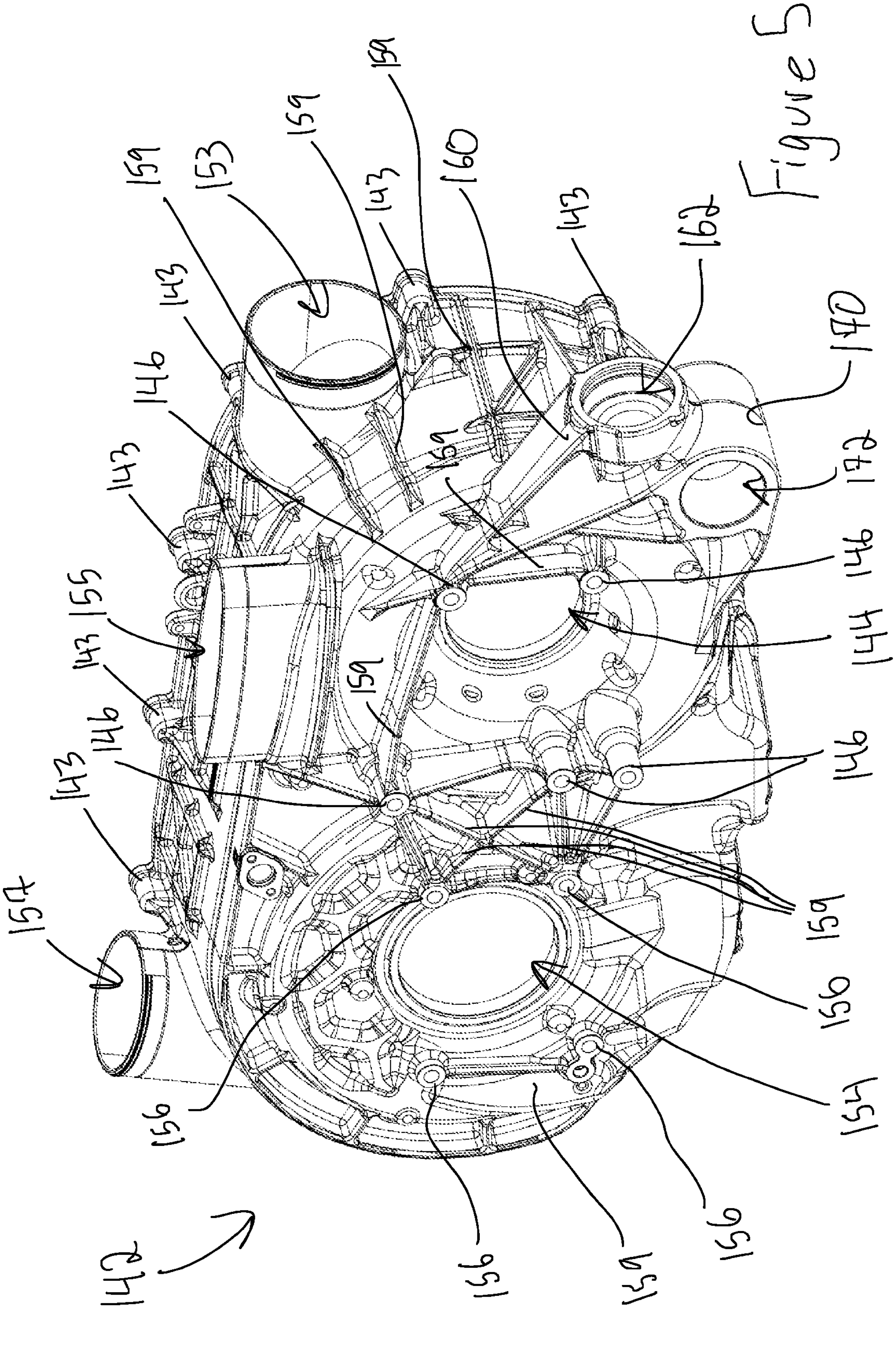
FIG. 5 is a top, front, right side perspective view of a right housing portion of the CVT of the powertrain of FIG. 2.

Referring to FIG. 5, the CVT housing 130 will now be described in greater detail. The CVT housing 130 has a left housing portion 140 and a right housing portion 142. In some embodiments, the CVT housing 130 may have three or more housing portions. The right housing portion 142 is disposed laterally between the left housing portion 140 and the engine housing 120. The left and right housing portions 140, 142 are connected to one another via bolts, such that the left and right housing portions 140, 142 are removably connected to one another. Thus, easy access to the interior of the CVT housing 130 can be provided. In some embodiments, the left and right housing portions 140, 142 may be connected differently, for example via quarter-turn fasteners.

The left housing portion 140 is made of a low weight material such as plastic. The right housing portion 142 is made of a material that is more rigid than the material of the left housing portion 140. In the present embodiment, the right housing portion 142 is made of an aluminum alloy although other metallic materials are contemplated. As will be described below, the right housing portion 142 is connected to the engine housing 120 and a transaxle housing 200, and the right housing portion 142 being made of a material with higher strength enables the right housing portion 142 to support this connection.

The right housing portion 142 has an open left side that is configured to be closed by the left housing portion 140. The right housing portion 142 has connecting segments 143 surrounding the open left side. The connecting segments 143 are configured to receive the bolts for connecting the left and right housing 140, 142 to one another.

The right housing portion 142 defines, on its right lateral side, a front shaft aperture 144 that is configured to receive the crankshaft 124 therethrough. The right housing portion 142 further has connecting members 146 positioned around the front shaft aperture 144. In the illustrated embodiments, there are five connecting members 146. The connecting members 146 extend laterally from the right lateral side of the right housing portion 142 toward the engine housing 120. The connecting members 146 enable the right housing portion 142 to connect to the engine housing 120 via fasteners such as bolts. In other embodiments, the right housing portion 142 may be connected to the engine housing 120 differently.

The right housing portion 142 also defines a rear shaft aperture 154 that is configured to receive an input shaft 210 of the transmission 107 therethrough. The right housing portion 142 further has connecting members 156 positioned around the rear shaft aperture 154. In the illustrated embodiments, there are four connecting members 156. The connecting members 156 extend laterally from the right lateral side surface of the right housing portion 142 toward the transaxle housing 200. The connecting members 156 enable the right housing portion 142 to connect to the transaxle housing 200 via fasteners such as bolts. In other embodiments, the right housing portion 142 may be connected to the transaxle housing 200 differently.

It will be noted that the right housing portion 142 also has a plurality of ribs 159. Some of the ribs 159 extend between the connecting members 146, between the connecting members 156, and between the connecting members 146, 156. The ribs 159 reinforce a structural integrity of the right housing portion 142 for, as mentioned above, supporting the connection of the right housing portion 142 to the engine housing 120 and to the transaxle housing 200. In some embodiments, the ribs 159 may be omitted.

At a front thereof, the right housing portion 142 defines a front air outlet 153. At a top thereof, the right housing portion 142 further defines a top air inlet 155 that is at least partially longitudinally aligned with the front shaft aperture 144. Still at the top thereof, the right housing portion 142 also defines a top air outlet 157 at a rear end thereof.

At a front, lower end thereof, the right housing portion 142 has a supporting portion 160. The supporting portion 160 extends laterally, and forwardly from the right lateral side of the right housing portion 142 toward the engine housing 120. The supporting portion 160 defines an aperture 162 oriented such that its radial center axis extends generally longitudinally. In some embodiments, the supporting portion 160 may define a recess instead of an aperture. The aperture 162 receives the driving shaft 110 therethrough to support the driving shaft 110.

The right housing portion 142 further has a mounting bracket 170. The mounting bracket 170 is laterally aligned with the supporting portion 160. Thus, the mounting bracket 170, like the supporting portion 160, extends laterally, and forwardly from the right lateral surface of the right housing portion 142 toward the engine housing 120. The mounting bracket 170 is further disposed vertically lower than the supporting portion 160. In the illustrated embodiment, the mounting bracket 170 is below the supporting portion 160. The mounting bracket 170 defines an aperture 172 that is oriented such that its radial center axis extends generally laterally. The aperture 172 receives part of the frame 12 therethrough. The orientation and/or shape of the aperture 172 may differ from one embodiment to another. The aperture 172 of the mounting bracket 170 is aligned with the aperture 127 of the mounting bracket 126.

The right housing portion 142 is a unitary component. This can assist in minimizing the number of components in the powertrain 100, which can simplify manufacturing and assembly of the powertrain 100, reduce manufacturing costs, and in some instance, improve strength of the right housing portion 142. It is contemplated however that in other embodiments, the right housing portion 142 may include two or more elements connected to one another.

Referring back to FIG. 6, the driven pulley 134 is operatively connected to the input shaft 210 of the transmission 108, which is partially received in the CVT housing 130 via the rear shaft aperture 154.

Figure 6:
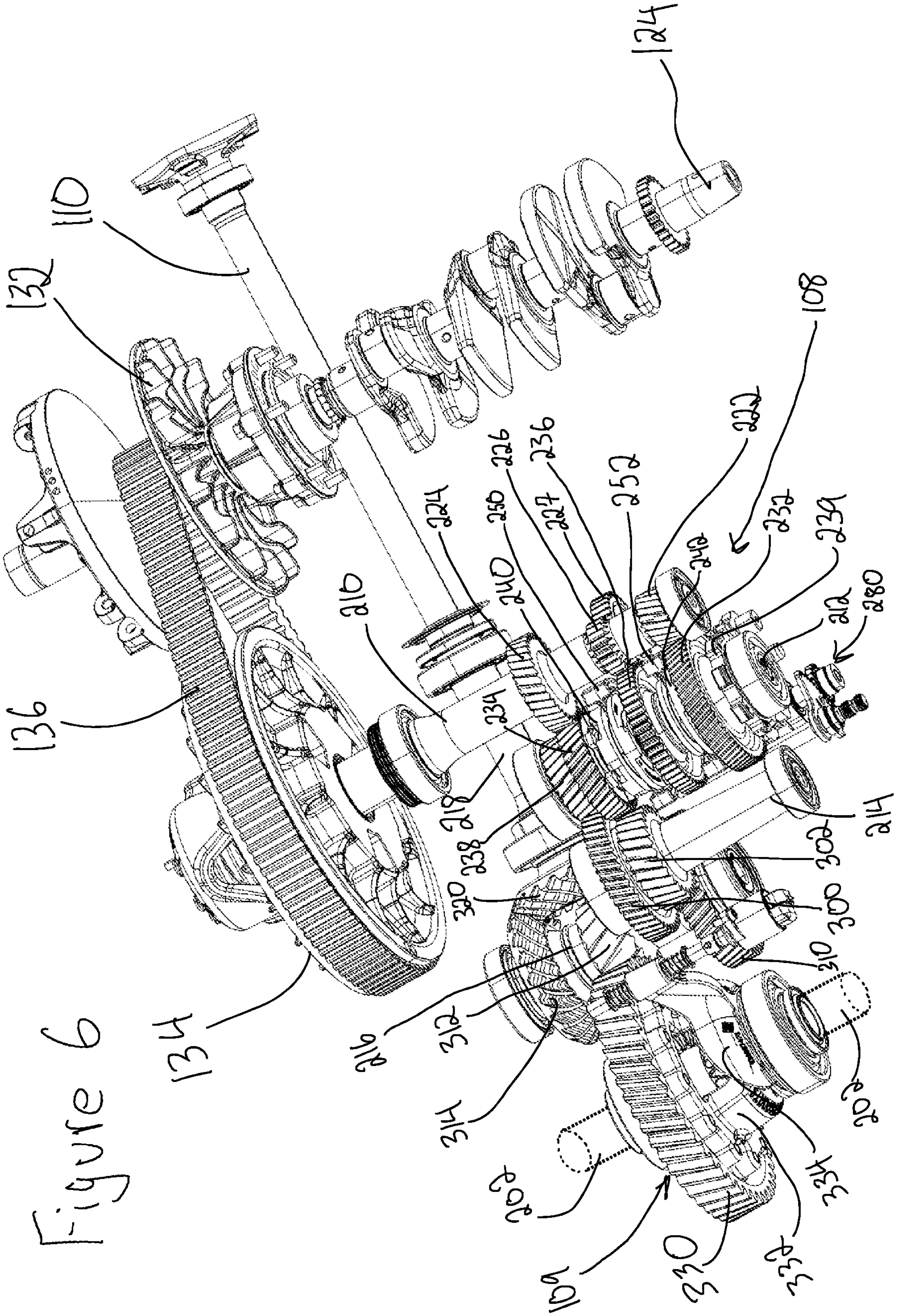
FIG. 6 is top, rear, right side perspective view of parts of the powertrain of FIG. 2, with housings of the engine, the CVT and the transaxle being omitted.
Figure 7:
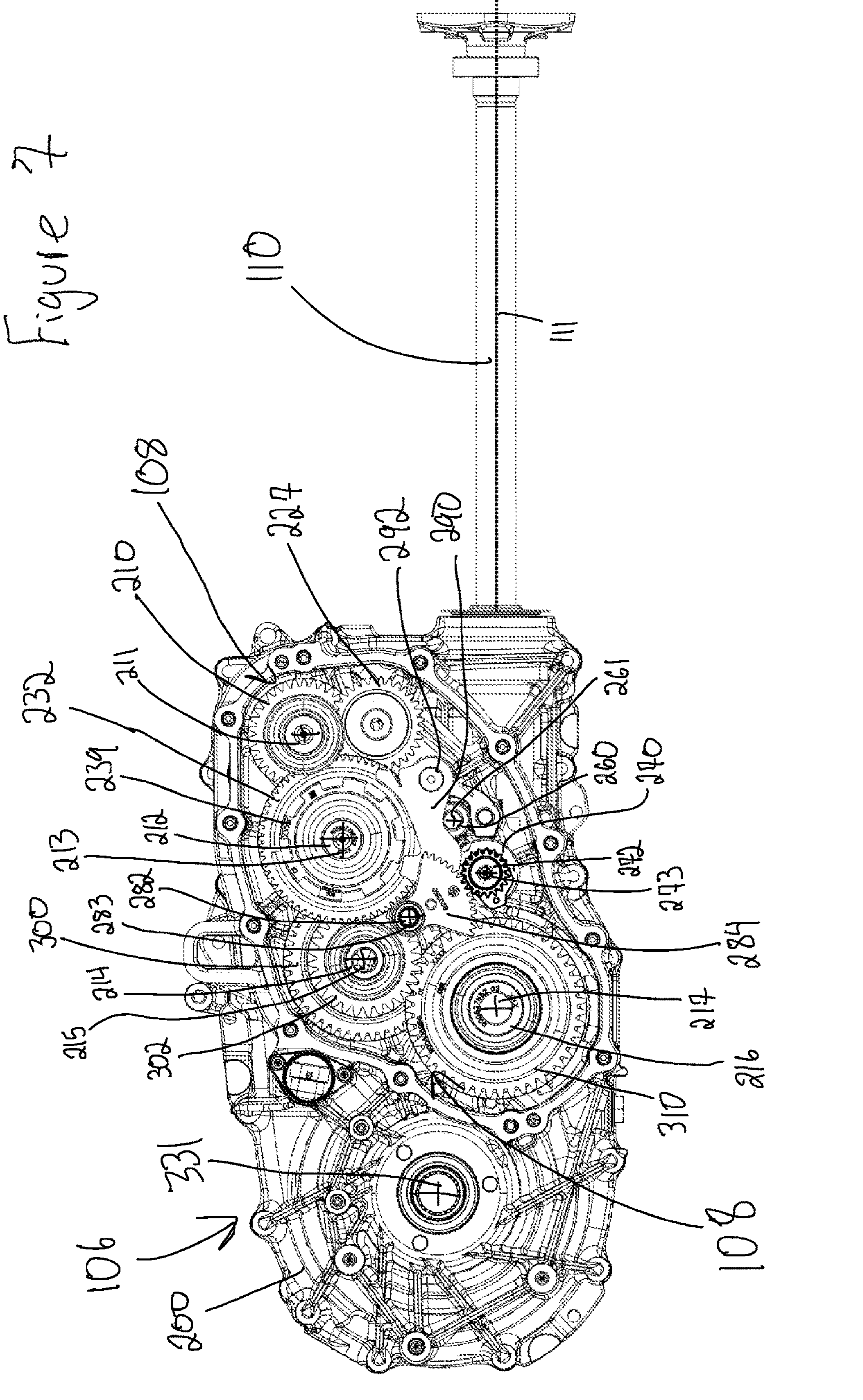
FIG. 7 is a right side elevation view of the transaxle and the driving shaft of the powertrain of FIG. 1, with part of the transaxle housing being omitted.
Figure 8:
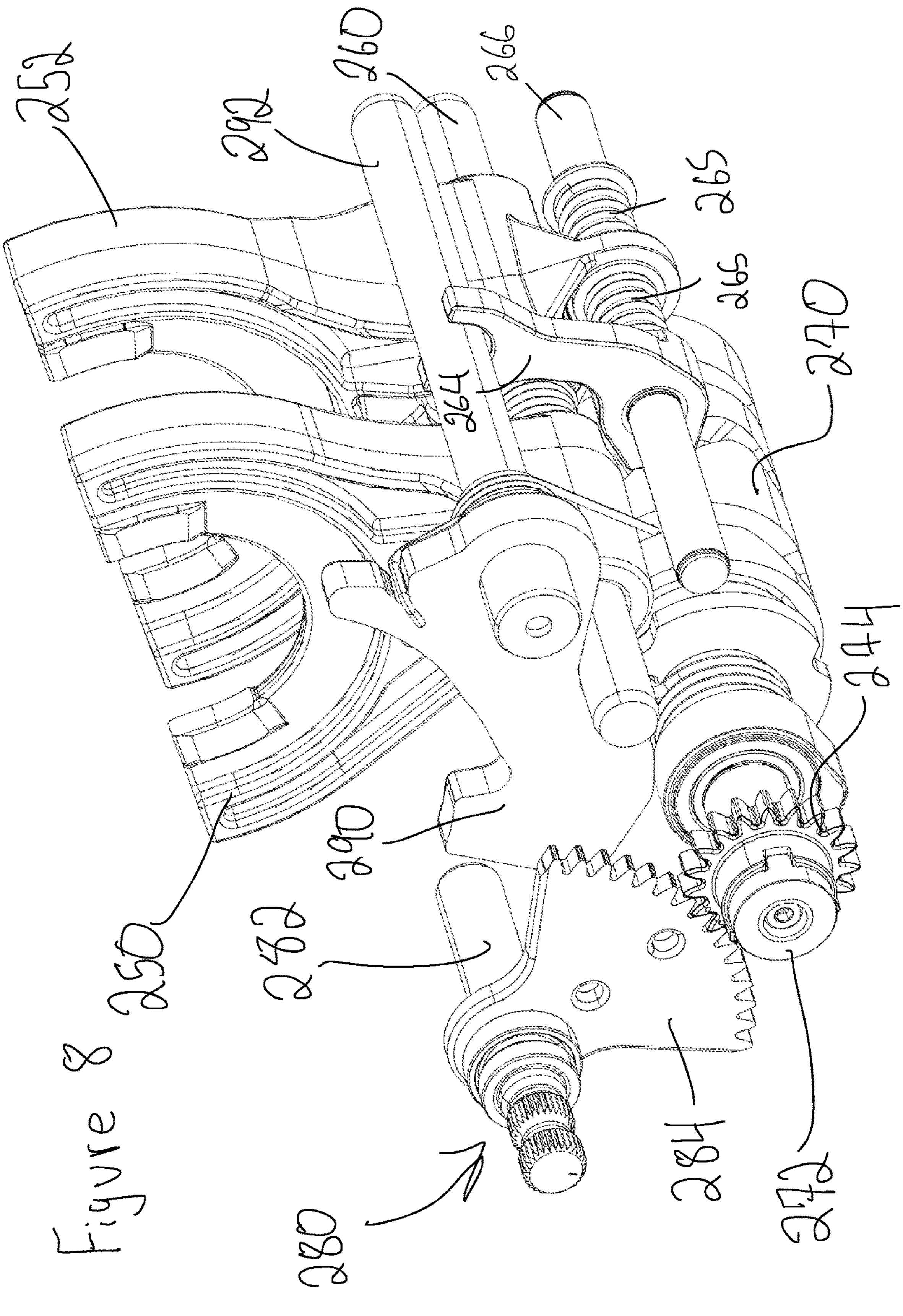
FIG. 8 is a top, front, right side perspective view of part of a transmission of the transaxle of FIG. 2.
Figure 9:
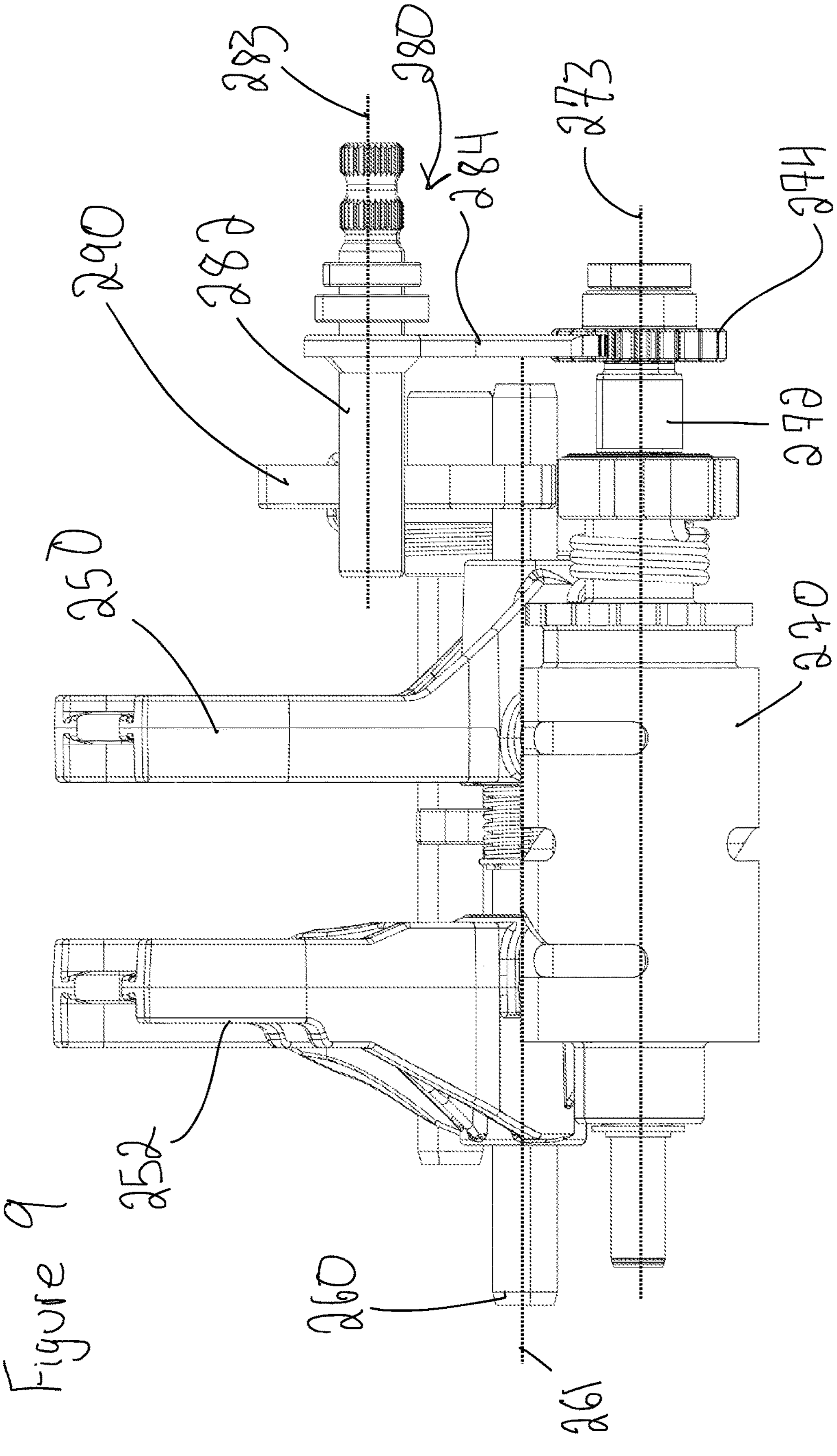
FIG. 9 is a rear elevation view of the part of the transmission of FIG. 8.

Referring to FIGS. 6 and 7, the transaxle 106 will now be described in greater detail. The transaxle 106 includes the transaxle housing 200, in which the transmission 108 and the differential 109 are disposed. In some instances, the transaxle housing 200 may be referred to a transmission housing. The transmission 108 controls the transfer of torque from the engine 102, via the CVT 104, to the driving shaft 110, as well as to rear driving axles 202 (schematically shown by dotted lines in FIG. 6) via the differential 109.

The transmission 108, which will now be described in greater detail, includes the input shaft 210, a main shaft 212, an intermediate shaft 214 and an output shaft 216. As will be described below, the input shaft 210 is drivingly engaged with the main shaft 212. The main shaft 212 is, in turn, drivingly engaged with the intermediate shaft 214. The intermediate shaft 214 is, in turn, drivingly engaged with the output shaft 216. The output shaft 216 is, in turn, drivingly engaged with an intermediate shaft 218, which is drivingly engaged with the driving shaft 110. The output shaft 216 is also drivingly engaged with the differential 109.

The input shaft 210, which is disposed toward a front end of the transaxle housing 200, extends generally laterally. The input shaft 210 rotates about an input axis 211. The input shaft 210 has thereon a plurality of gears for transferring torque to the main shaft 212. The plurality of gears includes a low input gear 222, a high input gear 224, and a reverse input gear 226. The gears 222, 224, 226 are rotationally fixed with respect to the input shaft 210, such that rotation of the input shaft 210 drives rotation of all of the gears 222, 224, 226 about the input axis 211.

The main shaft 212, which extends generally laterally, is disposed rearward from and vertically lower than the input shaft 210. The main shaft 212 is rotatable about a main axis 213. The main axis 213 is parallel to the input axis 211. The main axis 213 is also disposed vertically lower than and longitudinally rearward from the input axis 211. The main shaft 212 has thereon a plurality of gears engaged with the input gears 222, 224, 226. In the present embodiment, the gears on the main shaft 212 include a low output gear 232, a high output gear 234, and a reverse output gear 236. The main shaft 212 also includes an output gear 238 that is engaged with a gear 300 of the intermediate shaft 214. As can be seen in FIG. 6, for example, elements disposed on the main shaft 212 are arranged sequentially as follows: the output gear 238, the high output gear 234, an engagement dog 240 (described below), the reverse output gear 236, an engagement dog 242 (also described below), the low output gear 232, and a parking cog 239 (also described further below).

The output gears 232, 234, 236 are free to rotate about the main shaft 212 (i.e., the output gears 232, 234, 236 are not rotationally fixed to the main shaft 212), whereas the output gear 238 is rotationally fixed to the main shaft 212. The low output gear 232 is engaged with the low input gear 222, such that rotation of the input shaft 210 causes rotation of the low output gear 232 via the low input gear 222. Similarly, the high output gear 234 is engaged with the high input gear 224, such that rotation of the input shaft 210 causes rotation of the high output gear 234 via the high input gear 224. In some embodiments, the transmission 108 could omit one or both of the high or low gear arrangements and may include simply a drive gear arrangement.

The reverse input gear 226 and the reverse output gear 236 are not directly engaged. Instead, the reverse input gear 226 engages with an idler reverse gear 227. The idler reverse gear 227 further engages the reverse output gear 236. As a result, the reverse input gear 226 and the reverse output gear 236 rotate in the same direction. The reverse output gear 236 rotates in a direction opposite to the output gears 232, 234. In some embodiments, the reverse input gear 226 and the reverse output gear 236 could be operatively connected by a chain. It is also contemplated that the reverse gear arrangement could be omitted in some embodiments.

The main shaft 212 also includes the two engagement dogs 240, 242. The engagement dogs 240, 242 are for coupling the output gears 232, 234, 236 to the main shaft 212 to selectively cause rotation of the main shaft 212. The engagement dog 240 is disposed laterally between the high output gear 234 and the reverse output gear 236. The engagement dog 242 is disposed laterally between the reverse output gear 236 and the low output gear 232. The engagement dog 240 selectively engages with the high output gear 232 and the reverse output gear 236 (although only one at a time) and the engagement dog 242 selectively engages with the low output gear 232.

Each engagement dog 240, 242 is rotationally fixed with respect to the main shaft 212 via splines. As such, rotation of either engagement dog 240, 242, when engaged with a corresponding gear, causes rotation of the main shaft 212 at the speed and in the direction of rotation of the engaged gear. Each engagement dog 240, 242 is also axially translatable with respect to the main shaft 212 for fixedly connecting with corresponding output gears 232, 234, 236 (e.g., the engagement dog has a plurality of axially extending projections for inserting in a correspond set of openings in the sides of the output gears). Thus, by translating one of the engagement dogs 240, 242 into engagement with one of its corresponding output gears 232, 234, 236, the corresponding output gear 232, 234, 236 is rotationally linked to the main shaft 212 such that rotation of the engaged output gear 232, 234, 236 causes rotation of the main shaft 212.

While the engagement dogs 240, 242 are illustrated herein as being disposed on the main shaft 212, in some embodiments the engagement dogs 240, 242 could instead be disposed on the input shaft 210. In such a case, the input gears 222, 224, 226 would be rotationally independent of the input shaft 210 and the output gears 232, 234, 236 would be rotationally coupled with the main shaft 212. In some embodiments, it is also possible that one engagement dog could be used on each of the input and main shafts 210, 212.

Referring to FIGS. 6 to 9, the transmission 108 further includes two shift forks 250, 252 for controlling lateral displacement of the engagement dogs 240, 242. The shift fork 250 is operatively connected to the engagement dog 240 such that lateral movement of the shift fork 250 causes a corresponding lateral movement of the engagement dog 240 while rotational motion of the engagement dog 240 is not affected by the shift fork 250. Similarly, the shift fork 252 is operatively connected to the engagement dog 242 to control lateral movement of the engagement dog 242 while not impeding its rotational motion.

The two shift forks 250, 252 are supported by a fork rod 260. More specifically, the shift forks 250, 252 are slidably connected to the fork rod 260. The fork rod 260 is disposed vertically lower than the input shaft 210 and the main shaft 212. The fork rod 260 defines a fork rod axis 261. The fork rod axis 261 extends parallel to the input and main axes 211, 213. Additionally, the fork rod axis 261 is disposed longitudinally between, and vertically lower than, the input and main axes 211, 213.

The transmission 108 also includes a drive member 264 and biasing elements 265. The drive member 264 is mounted on a rod 266 such that in response to the drive member 264 moving laterally, the rod 266 also moves laterally. The biasing elements 265 are springs. Part of the shift fork 252 is connected to the rod 266, between the two biasing elements 265.

To selectively control torque transfer from the input shaft 210 to the main shaft 212, the transmission 108 also includes a shift drum 270 formed integrally with a shift drum shaft 272. that defines a shift drum axis 273. In some embodiments, the shift drum 270 and the shift drum shaft 272 may be two separate parts fixedly connected to one another. Specifically, the shift drum 270 selectively controls engagement and disengagement of the engagement dogs 240, 242 via control of lateral movement of the shift forks 250, 252 and the drive member 264 through rotation about the shift drum axis 273. The shift forks 250, 252 and the drive member 264 are operatively connected to the shift drum 270 via three grooves defined in the shift drum 270. A detailed description of a similar shift drum and shift fork can be found in U.S. Pat. No. 11,313,463 issued Apr. 26, 2022, the entirety of which is incorporated by reference herein. A gear 274 is also mounted on the shift drum shaft 272. The gear 274 is rotationally fixed to the shift drum shaft 272, such that rotation of the gear 274 causes rotation of the shift drum shaft 272. The gear 274 is operatively connected to a shift assembly 280 (described below), such that in response to the gear 274 being rotated by the shift assembly 280 about the shift drum axis 273, the shift drum shaft 272, and thus the shift drum 270, also rotate about the shift drum axis 273.

The shift assembly 280 is operatively connected to a gear selector (not shown) that is selectively operable by an operator of the vehicle 10 for selecting a desired gear setting such as low gear, high gear, reverse, park or neutral (i.e., choosing which one, if any, of the output gears 232, 234, 236 drives the main shaft 210). The shift assembly 280 includes a shift shaft 282 and a shift member 284.

The shift shaft 282 is disposed longitudinally rearward from, and vertically lower than, the input and main shafts 210, 212, and is disposed longitudinally rearward, and vertically higher than the fork rod 260. It is contemplated that in some embodiments, the shift shaft 282 may be positioned longitudinally forward and/or vertically lower than the fork rod 260. The shift shaft 282 defines a shift shaft axis 283. The shift shaft axis 283 extends parallel to the input, main and fork rod axes 211, 213, 261. The shift shaft axis 283 is disposed longitudinally rearward from, and vertically lower than the input and main axes 211, 213, and is disposed vertically higher than the fork rod axis 261.

The shift member 284 is connected to the shift shaft 282. The shift member 284 is a sector gear. In other embodiments, the shift member 284 may another type of gear. The shift member 284 is shaped and oriented such that a highest point of the shift member 284 is disposed vertically lower than the highest part of the shift forks 250, 252. The shift member 284 is drivingly engaged with the gear 274, such that in response to the gear selector being actuated, the shift member 284 is rotated, which causes rotation of the shift drum 270 by way of the gear 274.

Thus, in response to an operator of the vehicle 10 moving the gear selector, the shift member 284 is caused to rotate about the shift shaft axis 283, which causes the shift drum 270 to rotate about the shift drum axis 271. Rotation of the shift drum 270 causes, notably via the drive member 264 and the biasing elements 265, a lateral displacement of a corresponding one of the shift forks 250, 252, which in turn causes a lateral displacement of a corresponding one of the dogs 240, 242, resulting in a corresponding one of the output gears 232, 234, 236 drivingly engaging the main shaft 210.

The transmission 108 also includes a parking lever 290 rotatably connected to a support rod 292. It is also contemplated that the parking lever 180 could be connected to different components of the transmission 108. The parking lever 290 is selectively moveable to engage with or disengage from the parking cog 239. The parking cog 239 is rotationally fixed with respect to the main shaft 212, such that when the parking lever 290 is engaged to the parking cog 239 to prevent rotation of the parking cog 239, the main shaft 212 is also prevented from rotating.

Referring back to FIGS. 6 and 7, the intermediate shaft 214 extends generally laterally, and is disposed rearward from, and vertically lower than, the main shaft 212. The intermediate shaft 214 is further disposed rearward from, and vertically higher than the shift shaft 282 and the shift drum shaft 272. The intermediate shaft 214 is rotatable about an intermediate axis 215. The intermediate axis 215 is parallel to, and disposed vertically lower than the main axis 213. The intermediate axis 215 is also disposed vertically higher than the shift drum axis 273 and the shift shaft axis 283. The intermediate shaft 214 has thereon the gear 300 as well as a gear 302. The gears 300, 302 are rotationally fixed to the intermediate shaft 214. As such, rotation of either gears 300, 302, causes rotation of the intermediate shaft 214.

The output shaft 216 extends generally laterally, and is disposed vertically lower than the intermediate shaft 214. The output shaft 216 is rotatable about an output axis 217. The output axis 217 is parallel to, and disposed rearward from, and vertically lower than, the intermediate axis 215. The output axis 217 is also disposed vertically lower than the shift drum axis 273 and the shift shaft axis 283. The output shaft 216 has thereon a gear 310, a gear 312 and a bevel gear 314. The gears 310, 312, 314 are rotationally fixed to the output shaft 216. The gear 310 is drivingly engaged to the gear 302 to drive the output shaft 214 and the gears 312, 314. The gear 312 is drivingly engaged to a differential gear 330. The bevel gear 314 is drivingly engaged with a bevel gear 320 of the intermediate shaft 218.

Referring to FIG. 6, the differential 109 includes the differential gear 330, a differential carrier 332 in which internal differential gears (not shown) are disposed, and a differential lock 334.

The differential 109 defines a differential axis 331, about which the differential gear 330 is rotatable. The differential axis 331 is parallel to the output shaft axis 217. The differential axis 331 is disposed vertically lower than the shift shaft axis 283, and vertically higher than the shift drum axis 273. The differential gear 330 is operatively connected to the differential carrier 332, such that rotation of the differential gear 330 causes rotation of the differential carrier 332, and of the internal differential gears disposed therein. The internal differential gears are operatively connected to the two rear driving axles 202. The differential lock 334 is selectively operable by the operator of the vehicle 10 for locking the differential 109 for rotationally locking the driving axles 202 together.

The intermediate shaft 218 has the bevel gear 320, which, as mentioned above, is drivingly engaged with the bevel gear 314. The intermediate shaft 218 extends generally longitudinally, and is operatively connected to the driving shaft 110.

The driving shaft 110 extends in the longitudinal direction, and is supported by the CVT housing 130. More specifically, the driving shaft 110 is supported by the supporting portion 160 of the right housing portion 142. The right housing portion 142 can, inter alia, support the driving shaft 110 because it is made with the strong material. The driving shaft 110 defines an axis 111. The axis 111 extends generally longitudinally and is vertically aligned with output axis 217. As mentioned above, the driving shaft 110 is positioned laterally between the engine housing 120 and the CVT housing 122, and vertically higher than the lowest point of the engine housing 120, which is the oil pan 122 in the present embodiment, and vertically higher than the lowest point of the CVT housing 130. This positioning of the driving shaft 110 is in part enabled by the configuration of the transmission 100, notably due to the shift drum axis 273 and the shift shaft axis 283 being positioned vertically lower than the input shaft 210.

In operation, after selecting one of the output gears 232, 234, 236, the crankshaft 124 is caused to rotate. Rotation of the crankshaft 124 causes rotation of the drive pulley 132, which in turn drives rotation of the driven pulley 134 via the belt 136.

The driven pulley 134, in turn, causes the input shaft 210 to rotate. A selected one of the output gear 232, 234, 236 is drivingly engaged to the main shaft 212, such that a rotation of the input shaft 210 causes rotation of the main shaft 212 via the selected one of the output gear 232, 234, 236. The output gear 238 rotates with the main shaft 210. The output gear 238, by way of its engagement with the gear 300, causes the intermediate shaft 214, and thus the gear 302, to rotate.

The gear 302, in turn, by way of its engagement with the gear 310, causes the output shaft 216, and thus the gears 312, 314 to rotate. To the front, rotation of the bevel gear 314 causes the intermediate shaft 218 to rotate about a longitudinal axis. The intermediate shaft 218 in turn causes the driving shaft 110 to rotate about the axis 111. To the rear, rotation of the gear 312 causes rotation of the differential gear 330, which, in turn, drives the rear driving axles 202.

The relative position of the engine 102, the CVT 104, the transmission 108 and the driving shaft 110 (i.e., a lower position of the engine 102) results in lowering a vertical position of a center of mass of the powertrain 100, which lowers a vertical position of a cargo platform of the vehicle 100, and a vertical position of a center of mass of the vehicle 10. This can, notably, enhance driving performance of the vehicle. For example, a stability of the vehicle can be improved, which can enhance steering performance.

As mentioned above, this relative positioning is in part enabled by the transmission 108. Indeed, the positioning of components of the transmission 108 result in a more compact transmission 108. This can result in better oil flow, which can extend life of the components. Additionally, the transmission 108 can be cheaper to manufacture, and can thus contribute in lowering the vertical position of the center of mass of the powertrain 100.

The transmission 108 is configured to limit impact of debris, such as mud, that may make their way into the transaxle housing 200 via the openings of the differential 109. Indeed, since the shift shaft 282 is vertically higher than the differential axis 331, likelihood of the debris reaching the shift shaft 282 is reduced. Therefore, likelihood of the debris causing an issue between the shift shaft 282 and the gear selector is limited.

Modifications and improvements to the above-described embodiments of the present technology may become apparent to those skilled in the art. The foregoing description is intended to be exemplary rather than limiting.

What is claimed is:

1. A powertrain for a vehicle, the powertrain comprising:
- an engine;
- a continuously variable transmission (CVT) operatively connected to the engine, the CVT having a CVT housing;
- a transmission operatively connected to the CVT; and
- a driving shaft operatively connected to the transmission, the driving shaft being supported by the CVT housing, the driving shaft being positioned:
  - laterally between the engine and the CVT, and
  - vertically higher than a lowest point of the engine.

2. The powertrain of claim 1, wherein the engine has an oil pan, and the oil pan defines the lowest point of the engine.

3. The powertrain of claim 1, wherein the driving shaft is positioned vertically higher than a lowest point of the CVT.

4. The powertrain of claim 1, wherein:
- the driving shaft defines a longitudinal axis;
- the engine has an engine housing;
- the transmission has a transmission housing;
- the engine housing is disposed, with respect to the longitudinal axis, at least partially longitudinally forward from the transmission housing; and
- the driving shaft extends from the transmission housing, with respect to the longitudinal axis, longitudinally forward from the engine housing.

5. A powertrain for a vehicle, the powertrain comprising:
- an engine having an engine housing;
- a continuously variable transmission (CVT) operatively connected to the engine, the CVT having:
  - a CVT housing including a first housing portion and a second housing portion mounted to the first housing portion, the first housing portion being disposed between the engine housing and the second housing portion, and
  - a drive pulley and a driven pulley drivingly connected to the drive pulley, the drive pulley and the driven pulley being housed in the CVT housing, and rotation axes of the drive pulley and the driven pulley extending laterally through the first housing portion and the second housing portion;
- a transmission operatively connected to the CVT, the transmission having a transmission housing; and
- a driving shaft operatively connected to the transmission, wherein:
- the first housing portion is connected to the engine housing and to the transmission housing;
- the first housing portion has a supporting portion supporting the driving shaft; and
- the first housing portion has a mounting bracket for mounting the powertrain to the vehicle.

6. The powertrain of claim 5, wherein the first housing portion is made of a metal.

7. The powertrain of claim 6, wherein the metal is an aluminum alloy.

8. The powertrain of claim 5, wherein the first housing portion is a unitary component.

9. The powertrain of claim 5, wherein the supporting portion is disposed vertically higher than the mounting bracket.

10. The powertrain of claim 5, wherein the supporting portion extends laterally from the first housing portion toward the engine.

11. The powertrain of claim 5, wherein the mounting bracket is at least partially laterally aligned with the supporting portion.

* * * * *